United States Patent
Daniel et al.

(10) Patent No.: US 7,321,591 B2
(45) Date of Patent: *Jan. 22, 2008

(54) METHODS AND SYSTEMS FOR PROVIDING DIFFERENTIATED QUALITY OF SERVICE IN A COMMUNICATIONS SYSTEM

(75) Inventors: Wayne T. Daniel, Garland, TX (US);
Keith P. Knauber, Irving, TX (US);
Robert D. Kehn, The Colony, TX (US)

(73) Assignee: Efficient Networks, Inc., Dallas, TX (US)

( * ) Notice: Subject to any disclaimer, the term of this patent is extended or adjusted under 35 U.S.C. 154(b) by 1068 days.

This patent is subject to a terminal disclaimer.

(21) Appl. No.: 10/253,965

(22) Filed: Sep. 24, 2002

(65) Prior Publication Data

US 2004/0057437 A1    Mar. 25, 2004

(51) Int. Cl.
*H04L 12/28* (2006.01)
(52) U.S. Cl. .............................. 370/395.21; 370/395.2; 370/392
(58) Field of Classification Search ...................... None
See application file for complete search history.

(56) References Cited

U.S. PATENT DOCUMENTS

| 6,104,700 | A | * | 8/2000 | Haddock et al. ............. 370/235 |
| 6,167,445 | A | | 12/2000 | Gai et al. |
| 6,748,439 | B1 | * | 6/2004 | Monachello et al. ........ 709/229 |
| 7,061,919 | B1 | * | 6/2006 | Anschutz ................ 370/395.43 |
| 2002/0101870 | A1 | * | 8/2002 | Chase et al. ................. 370/389 |
| 2003/0123460 | A1 | * | 7/2003 | Mackiewich et al. ........ 370/401 |
| 2004/0057433 | A1 | * | 3/2004 | Daniel et al. ................ 370/392 |

* cited by examiner

*Primary Examiner*—Duc Ho

(57) ABSTRACT

A communications system that facilitates the provision of differentiated quality of service is disclosed, including a marker for receiving a packet of data from an application (110), for examining the packet for predefined criteria, for setting the value of QoS bits in the packet based on the predefined criteria, and for forwarding the packet to a multiple Virtual Circuit (multi-VC) bridge (300). The multi-VC bridge (300) is connected to the marker and selects an Asynchronous Transfer Mode (ATM) Permanent Virtual Circuit (PVC) (120, 122, 124) over which to transmit the packet by mapping the value of the QoS bits to a PVC in a mapping table and forwards the packet over the selected PVC to a destination address.

20 Claims, 7 Drawing Sheets

| PRIORITY | PRECEDENCE | DELAY | THROUGHPUT | RELIABILITY | COMMENT |
|---|---|---|---|---|---|
| 4 | 010-111 | X | X | X | VOICE |
| 3 | 001 | X | 1 | X | VIDEO |
| 2 | 001 | X | 0 | X | HIGH PRIORITY DATA |
| 1 | 000 | X | X | X | BEST EFFORT DATA |

FIG. 5

| VPI/VCI | PRIORITY LEVEL | USE |
|---------|----------------|------|
| 0/35 | 1 - LOWEST | DATA |
| 0/37 | 2 | PRIORITY DATA |
| 0/50 | 3 | VIDEO |
| 0/40 | 4 - HIGHEST | VOICE |

FIG. 6

METHODS AND SYSTEMS FOR PROVIDING DIFFERENTIATED QUALITY OF SERVICE IN A COMMUNICATIONS SYSTEM

CROSS-REFERENCE TO RELATED U.S. APPLICATION

This application is related to co-pending application Ser. No. 10/253,969 entitled "Methods and Systems for Prioritizing Packets of Data in a Communications System," filed on the same date herewith and incorporated by reference herein in its entirety.

FIELD OF THE INVENTION

The present invention relates to communications systems, and more particularly to methods and systems for providing differentiated quality of service in communications systems.

BACKGROUND

Paths through the Internet vary widely in the quality of service they provide. The traditional best-effort model of the Internet does not differentiate between traffic flow that is generated by different hosts. As traffic flow varies, the network provides the best service it can. There are no controls for guarantying a high level of service for some traffic flow and not for others.

Although the Internet itself has no direct controls for optimizing paths for particular applications or users, the Internet Protocol (IP) does provide a header that contains bits for specifying Quality of Service (QoS) information. The value of the QoS information is intended to denote how the network should treat packets of data with regard to throughput, delay, reliability, and cost. QoS information may be conveyed, for example, in layer 2 MAC frame packets as defined in IEEE 802.1p/Q (via the priority field) or in layer 3 IP packets (via the TOS field). The TOS facility, for example, was outlined in Request for Comment (RFC) 791 ("Internet Protocol," September 1981), authored by the Internet Engineering Task Force (IETF) and available via the Internet at http://www.ietf.org. Although the TOS facility has been a part of the IP specification for quite some time, few attempts have been made to utilized it until recently. Recent RFCs from IETF, such as RFC 1633 ("Integrated Services in the Internet Architecture: An Overview") and RFC 2475 ("An Architecture for Differentiated Services") are beginning to define how packets should be routed.

FIG. 1 illustrates a conventional communications system including a multiple-Virtual-Circuit (multi-VC) bridge 115 connecting one or more data processing systems 110 to network devices 130, 132, 134 in, for example, a Wide Area Network (WAN) 140. The data processing systems 110 produce and transmit packets of data to the multi-VC bridge via one or more physical or wireless communications paths. The data processing systems 110 may be different devices, such as computers, voice-over-IP phones, or set-top boxes.

The multi-VC bridge 115 is responsible for receiving packets of data from the data processing systems 110 and forwarding them to their destinations over Asynchronous Transfer Mode (ATM) Permanent Virtual Circuits (PVCs) 120, 122, 124 in an ATM network. As illustrated in FIG. 1, each PVC 120, 122, 124 is associated with a specific network device 130, 132, 134, each having a unique Media Access Control (MAC) address. In this configuration, the multi-VC bridge 115 monitors packets of data from the WAN 140 by snooping (i.e., examining) each packet of data for its source MAC address and storing the learned addresses in a mapping table. When packets are transmitted to the WAN 140, the multi-VC bridge 115 examines the MAC destination address, looks up that address to determine which PVC corresponds to the address, and then forwards the packet of data over that PVC.

FIG. 2 illustrates a second communications system 200 suitable for implementing the present invention. Communications system 200 includes multiple PVCs 120, 122, 124 connecting a multi-VC bridge 115 and to a WAN 140. In communications system 200, the PVCs 120, 122, 124 terminate on a single piece network equipment, such as a broadband remote access server (BRAS) 150. The BRAS 150 is responsible for forwarding the packets of data to their appropriate destination equipment represented by 160, 162, and 164. The BRAS 150 typically has a single MAC address associated with it and all of the PVC's terminate at that MAC address. In such a configuration, the multi-VC bridge 300 may choose from among different PVCs when forwarding packets. As a result, a need exists for an improved multi-VC bridge that intelligently chooses from available PVCs to facilitate the provision of differentiated quality of service.

SUMMARY OF THE INVENTION

With the foregoing in mind, methods and systems consistent with the present invention facilitate the provision of differentiated quality of service in a communications system by providing an improved multi-VC bridge that examines QoS information in the headers of packets, maps the priority level to an appropriate ATM PVC, and forwards the packet over that PVC.

This and other objects, features, and advantages in accordance with the present invention are provided by a method of transmitting a packet of data from an application in a data processing system to a destination address via a selected one of a plurality of Permanent Virtual Circuits (PVCs) selected by a multiple Virtual Circuit (multi-VC) bridge based on a value of Quality of Service (QoS) bits in said packet. The method comprises the steps of (a) receiving, by said multi-VC bridge, said packet; (b) inspecting, by said multi-VC bridge, said packet to determine said value of said QoS bits; (c) selecting, by said multi-VC bridge, said selected one of said plurality of PVCs by mapping said value of said QoS bits to a corresponding PVC; and (d) transmitting, by said multi-VC bridge, said packet to said destination address via said selected one of said plurality of PVCs.

A method is also provided for prioritizing a packet of data transmitted by an application in a data processing system to facilitate transmission and prioritization of said packet in a communications system. The method comprises the steps of (a) receiving, by a marker, said packet from said application in said data processing system; (b) examining, by said marker, said packet for predefined criteria; (c) setting, by said marker, a value of QoS bits in said packet based on said predefined criteria; (d) receiving, by a multi-VC bridge, said packet; (e) inspecting, by said multi-VC bridge, said packet to determine said value of said QoS bits; (f) selecting, by said multi-VC bridge, a selected one of a plurality of Asynchronous Transfer Mode (ATM) Permanent Virtual Circuits (PVCs) by mapping said value of said QoS bits to a PVC via a mapping table; and (g) transmitting, by said multi-VC bridge, said packet to a destination address via said selected one of said plurality of PVCs.

A communications system is provided for transmitting a packet of data from an application in a data processing system to a destination address via a selected one of a plurality of Permanent Virtual Circuits (PVCs) selected by a multiple Virtual Circuit (multi-VC) bridge based on a value of Quality of Service (QoS) bits in said packet. The communications system comprises means for receiving said packet; means for inspecting said packet to determine said value of said QoS bits; means for selecting said selected one of said plurality of PVCs by mapping said value of said QoS bits to a corresponding PVC in a mapping table; and means for transmitting said packet to said destination address via said selected one of said plurality of PVCs.

A system is provided for prioritizing a packet of data transmitted by an application in a data processing system. The system comprises means for receiving said packet from said application in said data processing system; means for examining said packet for predefined criteria; means for setting a value of QoS bits in said packet based on said predefined criteria; means forwarding said packet to a multi-VC bridge; means for inspecting, at said multi-VC bridge, said packet to determine said value of said QoS bits; means for selecting, at said multi-VC bridge, a selected one of a plurality of Asynchronous Transfer Mode (ATM) Permanent Virtual Circuits (PVCs) by mapping said value of said QoS bits to a PVC in a mapping table; and means for transmitting, from said multi-VC bridge, said packet to said destination address via said selected one of said plurality of PVCs.

A communications system is provided for prioritizing a packet of data transmitted from an application in a data processing system to a destination address. The communications system comprises a marker for receiving said packet from said application, for examining said packet for predefined criteria, for setting a value of QoS bits in said packet based on predefined criteria, and for forwarding said packet to a multiple Virtual Circuit (multi-VC) bridge; and a multi-VC bridge connected to said marker for selecting a Permanent Virtual Circuit (PVC) over which to transmit said packet by mapping said value of said QoS bits to a PVC in a mapping table and for forwarding said packet over said selected PVC to said destination address.

BRIEF DESCRIPTION OF THE DRAWINGS

FIG. 5 illustrates an exemplary priority mapping table consistent with the present invention.

FIG. 6 illustrates an exemplary PVC mapping table consistent with the present invention.

DETAILED DESCRIPTION

Figure 1:
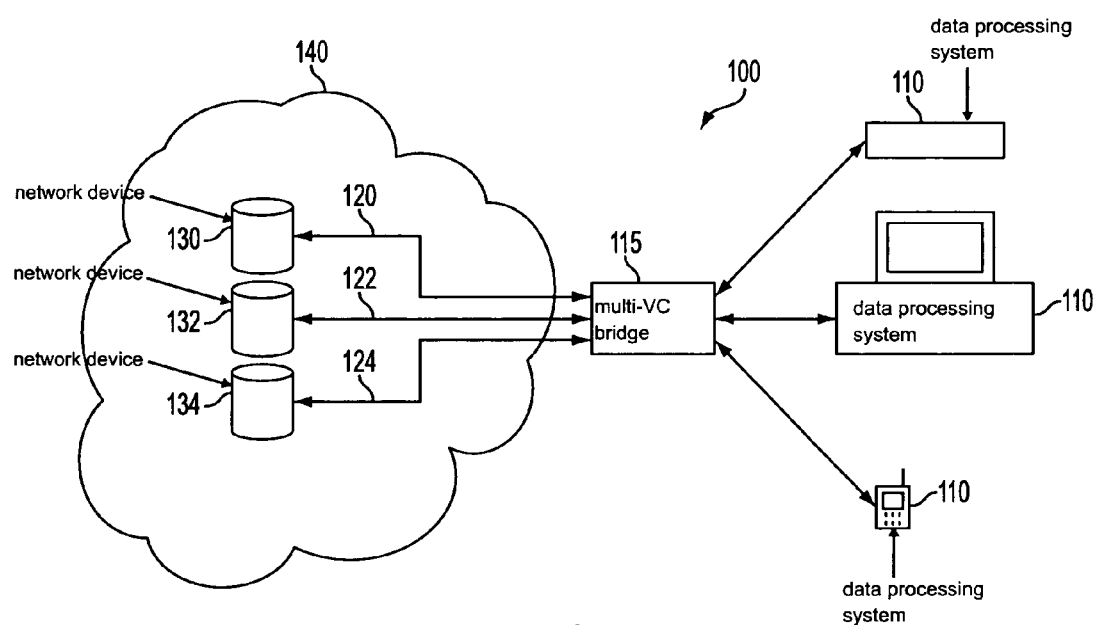
FIG. 1 illustrates a conventional communications system with multiple PVCs terminating on different network devices.
Figure 2:
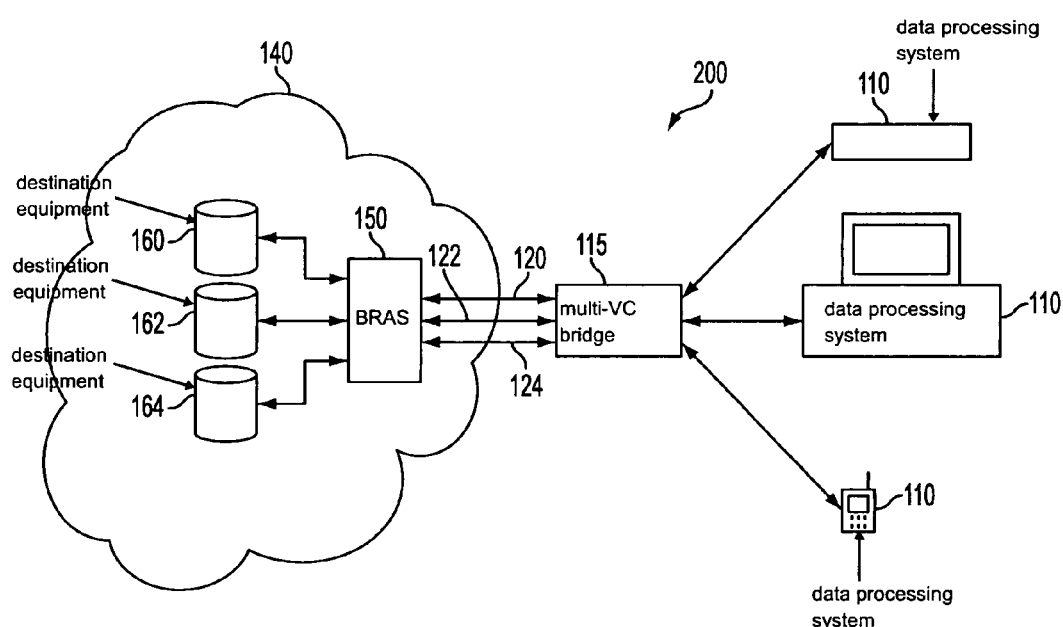
FIG. 2 illustrates a communications system consistent with the present invention.
Figure 3:
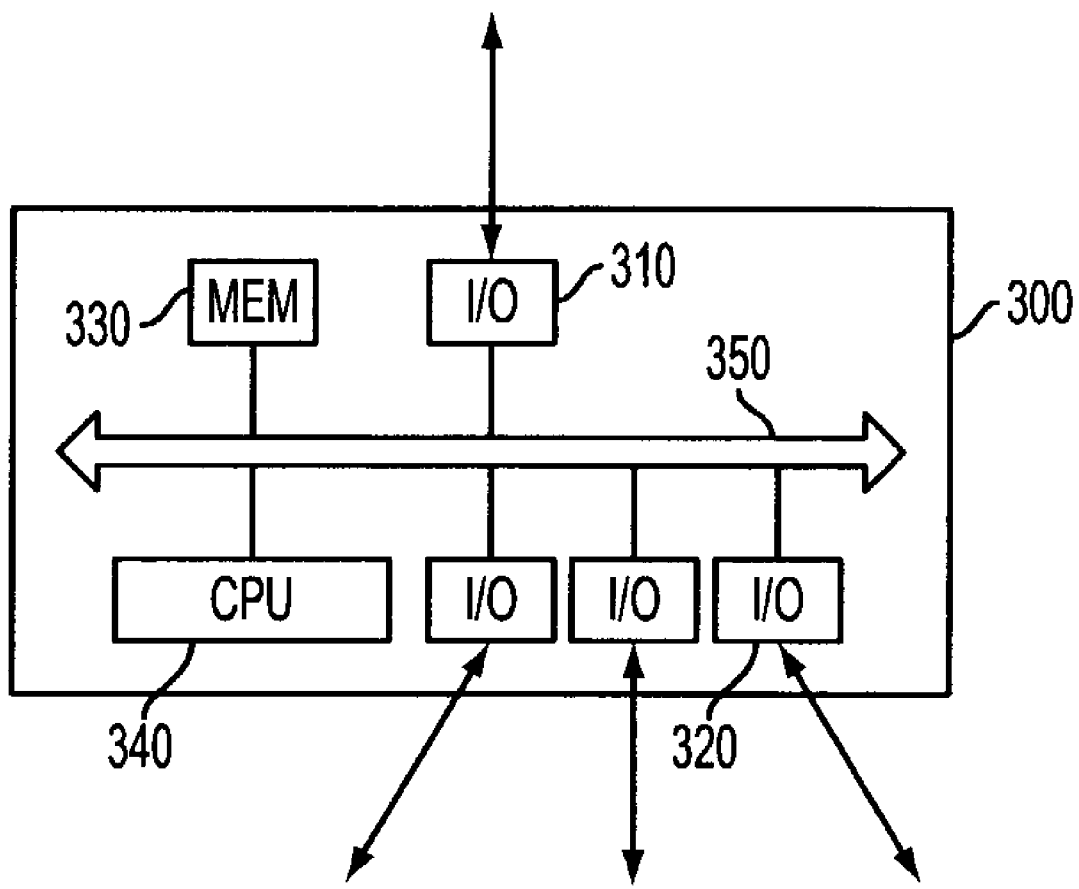
FIG. 3 illustrates the multi-VC bridge of FIG. 2.

FIG. 3 illustrates an improved multi-VC bridge 300 consistent with the present invention. The improved multi-VC bridge 300 includes an input/output interface and buffer 310 for buffering packets of data to or from a downstream communications path and multiple input/output interfaces and buffers 320 for buffering to or from upstream PVCs. The improved multi-VC bridge 300 also includes a memory 330, for temporarily storing program instructions and for storing packets; a central processing unit (CPU) 340; and an internal bus 350. The CPU 340 is responsible for initializing and managing the operations of the multi-VC bridge 300, such as packet receipt, mapping and forwarding decisions.

The improved multi-VC bridge 300 receives packets of data from one or more data processing systems and makes decisions regarding which PVCs to utilize to forward the packets by snooping (i.e., examining) the MAC destination address and QoS information in the headers of packets to determine their value. If a destination address exists on multiple PVCs, then the multi-VC bridge must choose a PVC over which to forward a packet. The improved multi-VC bridge chooses a PVC by querying a pre-defined table that associates QoS information to PVCs and then mapping the QoS information to one or more corresponding PVCs.

Figure 4:
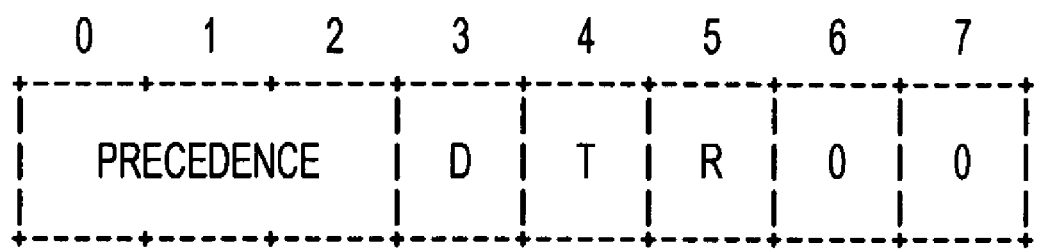
FIG. 4 illustrates the field definitions for IP TOS bits.

The mapping of the value of the QoS information of packets to a PVC may be accomplished in different ways that are consistent with the present invention. The header of each packet of data may, for example, contain IP Type of Service (TOS) bits or IEEE 802.1p/Q priority bits (hereinafter referred to generically as QoS bits). The information contained within the QoS bits may also be defined in different ways. For example, the IP TOS field definitions established by RFC 791 are listed below and are illustrated in FIG. 4:

Bits 0-2: Precedence.
Bit 3: 0=Normal Delay, 1=Low Delay.
Bits 4: 0=Normal Throughput, 1=High Throughput.
Bits 5: 0=Normal Reliability, 1=High Reliability.
Bits 6-7: Reserved for Future Use.

FIG. 5 illustrates an example of a table for mapping QoS bits to a priority level. Those of skill in the art will appreciate that many other mapping tables would be consistent with the present invention. In FIG. 5, the most logical Precedence values of "Routine" and "Priority" have been used for best effort and high priority data. The Throughput bit has been used in conjunction with the Precedence field to identify video data. Any Precedence value of "Immediate" or higher has been used to identify voice (or control) data. FIG. 6 illustrates an example of a table for mapping priority levels to a Virtual Path Indicator/Virtual Channel Indicator (VPI/VCI) for a specific PVC. Again, those of skill in the art will appreciate that many other mapping tables are consistent with the present invention. In FIG. 6, each priority level has been assigned to a different PVC. Utilizing the information contained in the mapping tables of FIGS. 5 and 6 (which may also be combined into a single mapping table), the improved multi-VC bridge selects one PVC over which to forward each packet of data. In the preferred embodiment, the improved multi-VC bridge makes forwarding decisions at Layer 2 or Layer 3. However, for embodiments that do not utilize IEEE 802.1p/Q (because IEEE 802.1p/Q requires hardware support) priority mapping must be obtained from the IP layer. In this case, IP TOS bits are used to identify priorities.

Figure 7:
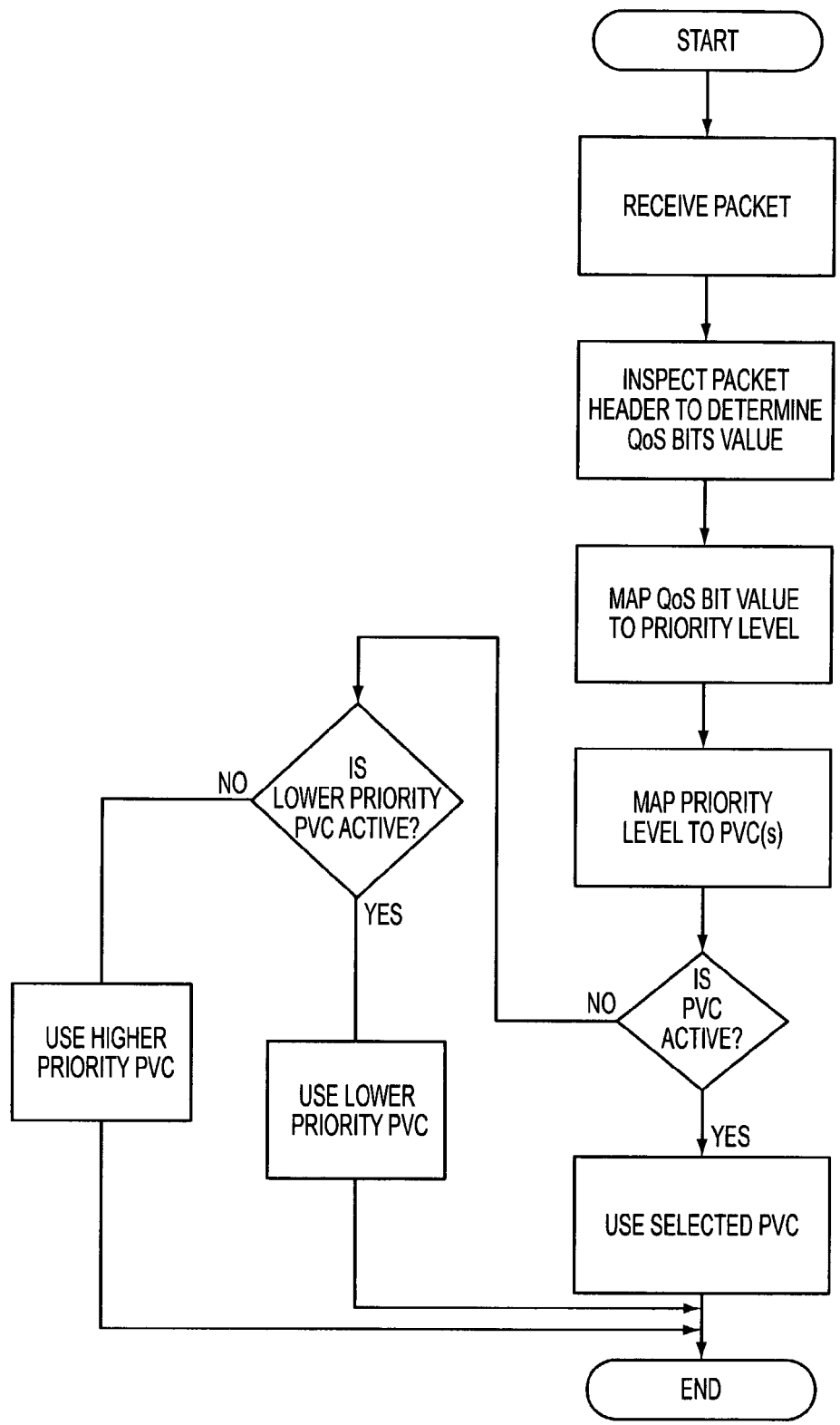
FIG. 7 illustrates a flowchart of an exemplary algorithm for use by the multi-VC bridge of FIG. 3.

The first PVC chosen by the improved multi-VC bridge may not always be active. FIG. 7 illustrates a flowchart of an exemplary algorithm for the improved multi-VC bridge for selecting a PVC when the first PVC selected in not active. The multi-VC bridge begins by receiving a packet. The multi-VC then inspects the header of the packet to determine the value of the QoS bits therein. The multi-VC bridge then maps the value of the Qos bits to a priority level and an ATM PVC. If the first chosen PVC is active, that PVC is used for forwarding the packet. If the first chosen PVC is not active, a PVC having a lower priority is used for forwarding the packet. If a lower priority PVC is not active a higher priority PVC is used for forwarding the packet.

The present invention has been described with reference to the accompanying drawings that illustrate preferred embodiments of the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. Thus, the scope of the invention should be determined based upon the appended claims and their legal equivalents, rather than the specific embodiments described above.

What is claimed is:

1. A method of transmitting a packet of data from an application in a data processing system to a destination address via a selected one of a plurality of Permanent Virtual Circuits (PVCs) that is selected by a multiple Virtual Circuit (multi-VC) bridge based on a value of Quality of Service (QoS) bits in said packet, comprising the steps of:
   receiving, by said multi-VC bridge, said packet;
   inspecting, by said multi-VC bridge, said packet to determine said value of said QoS bits;
   selecting, by said multi-VC bridge, said selected one of said plurality of PVCs by mapping said value of said QoS bits to a corresponding PVC; and
   transmitting, by said multi-VC bridge, said packet to said destination address via said selected one of said plurality of PVCs.

2. The method of claim 1, further comprising the steps of determining whether said selected PVC is active, and
   if said PVC is not active, sending said packet via an active lower priority PVC, and if no lower priority level PVC is active, sending said packet via a higher priority level PVC.

3. A method of prioritizing a packet of data transmitted by an application in a data processing system to facilitate transmission and prioritization of said packet in a communications system, comprising the steps of:
   receiving, by a marker, said packet from said application in said data processing system;
   examining, by said marker, said packet for predefined criteria;
   setting, by said marker, a value of QoS bits in said packet based on said predefined criteria;
   receiving, by a multi-VC bridge, said packet;
   inspecting, by said multi-VC bridge, said packet to determine said value of said QoS bits;
   selecting, by said multi-VC bridge, a selected one of a plurality of Asynchronous Transfer Mode (ATM) Permanent Virtual Circuits (PVCs) by mapping said value of said QoS bits to a PVC via a mapping table; and
   transmitting, by said multi-VC bridge, said packet to a destination address via said selected one of said plurality of PVCs.

4. The method of claim 3 wherein said step of receiving said packet by a marker comprises receiving said packet by Point to Point Protocol over Internet (PPPoE) client software.

5. The method of claim 3 wherein said step of receiving said packet by a marker comprises receiving said packet by a router external from said data processing system.

6. The method of claim 3 wherein said predefined criteria is an indication of a physical port from which said packet arrived.

7. The method of claim 3 wherein said predefined criteria is an indication of an Internet Protocol (IP) source or destination address.

8. The method of claim 3 wherein said predefined criteria is an indication of a TCP or UDP port number.

9. The method of claim 3 wherein said predefined criteria is information at an application layer.

10. The method of claim 3 wherein said predefined criteria is an indication of a TCP or UDP session.

11. A communications system for transmitting a packet of data from an application in a data processing system to a destination address via a selected one of a plurality of Permanent Virtual Circuits (PVCs) selected by a multiple Virtual Circuit (multi-VC) bridge based on a value of Quality of Service (QoS) bits in said packet, comprising:
    means for receiving said packet;
    means for inspecting said packet to determine said value of said QoS bits;
    means for selecting said selected one of said plurality of PVCs by mapping said value of said QoS bits to a corresponding PVC in a mapping table; and
    means for transmitting said packet to said destination address via said selected one of said plurality of PVCs.

12. A system for prioritizing a packet of data transmitted by an application in a data processing system, comprising:
    means for receiving said packet from said application in said data processing system;
    means for examining said packet for predefined criteria;
    means for setting a value of QoS bits in said packet based on said predefined criteria;
    means forwarding said packet to a multi-VC bridge;
    means for inspecting, at said multi-VC bridge, said packet to determine said value of said QoS bits;
    means for selecting, at said multi-VC bridge, a selected one of a plurality of Asynchronous Transfer Mode (ATM) Permanent Virtual Circuits (PVCs) by mapping said value of said QoS bits to a PVC in a mapping table; and
    means for transmitting, from said multi-VC bridge, said packet to said destination address via said selected one of said plurality of PVCs.

13. A communications system for prioritizing a packet of data transmitted from an application in a data processing system to a destination address, comprising:
    a marker for receiving said packet from said application, for examining said packet for predefined criteria, for setting a value of QoS bits in said packet based on predefined criteria, and for forwarding said packet to a multiple Virtual Circuit (multi-VC) bridge; and
    a multi-VC bridge connected to said marker for selecting a Permanent Virtual Circuit (PVC) over which to transmit said packet by mapping said value of said QoS bits to a PVC in a mapping table and for forwarding said packet over said selected PVC to said destination address.

14. The system of claim 13 wherein said marker comprises Point to Point Protocol over Internet (PPPoE) client software in said data processing system.

15. The system of claim 13 wherein said marker comprises a router external from said data processing system.

16. The system of claim 13 wherein said predefined criteria is an indication of a physical port from which said packet arrived.

17. The system of claim 13 wherein said predefined criteria is an indication of an Internet Protocol (IP) source or destination address.

18. The system of claim 13 wherein said predefined criteria is an indication of a TCP or UDP port number.

19. The system of claim 13 wherein said predefined criteria is information at an application layer.

20. The system of claim 13 wherein said predefined criteria is an indication of a TCP or UDP session.

* * * * *